Aug. 18, 1953  C. H. GRANT  2,649,265
AIRPLANE WITH STABILIZING FINS
Filed July 30, 1948  2 Sheets-Sheet 1

INVENTORS
Charles H. Grant
BY
ATTORNEYS

Aug. 18, 1953  C. H. GRANT  2,649,265
AIRPLANE WITH STABILIZING FINS
Filed July 30, 1948  2 Sheets-Sheet 2
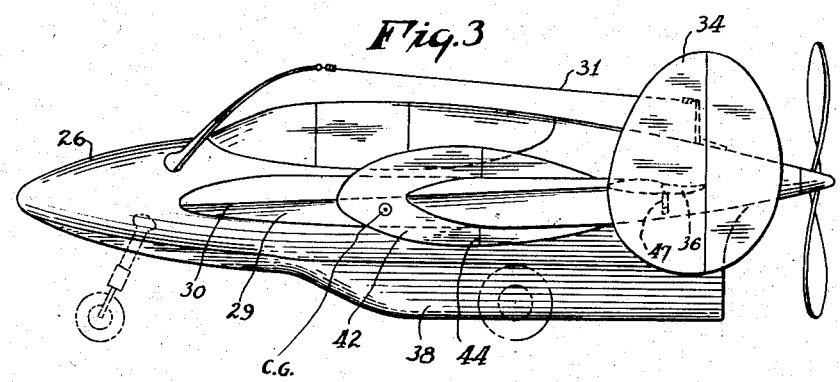
Fig. 3
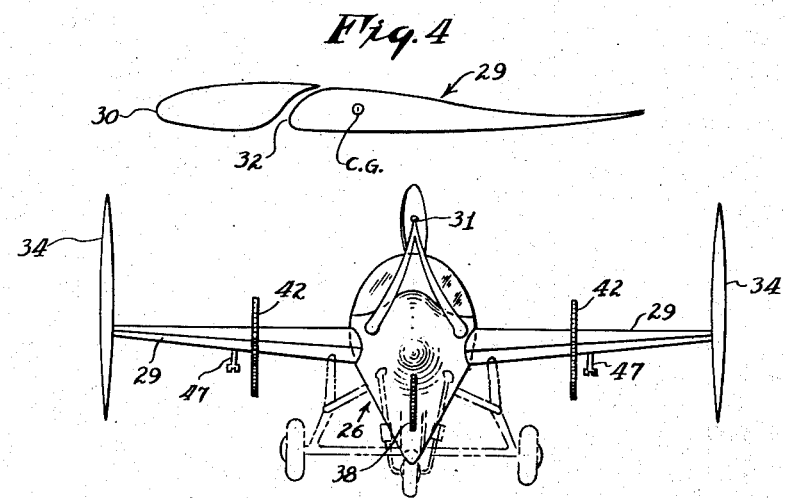
Fig. 4
Fig. 5
INVENTORS
Charles H. Grant
BY Emery, Varney,
Whittemore & Dix,
ATTORNEYS

UNITED STATES PATENT OFFICE 2,649,265

AIRPLANE WITH STABILIZING FINS

Charles H. Grant, New Rochelle, N. Y.

Application July 30, 1948, Serial No. 41,602

2 Claims. (Cl. 244—91)

This invention relates to aircraft and more particularly to an aircraft construction of improved stability.

One object of the invention is to provide a more stable aircraft. Different features of the invention relate to stability of the craft about different axes. Longitudinal stability is obtained with an airfoil section shaped to give lift and provided with a rearward portion that is in effect set negative to the forward portion of the airfoil. A slot between the forward and rearward portions prevents excessive longitudinal movements of the center of pressure. Transverse stability is obtained by the use of a swept back wing, vertical wing plates, and by a center fin or keel that reduces the lift of the high wing when the aircraft tilts sideways.

This application is a continuation in part of my copending application Serial No. 505,289, filed October 7, 1943, now abandoned.

Other objects, features and advantages of the invention will appear or be pointed out as the description proceeds.

In the drawing, in which like reference characters denote corresponding parts in all the views:

Figure 3 is a side elevation of the aircraft shown in Figures 1 and 2,

Figure 4 is a diagrammatic sectional view showing the contour of the airfoil,

Figure 5 is a front elevation of the structure shown in Figures 1–3.

Figure 1:
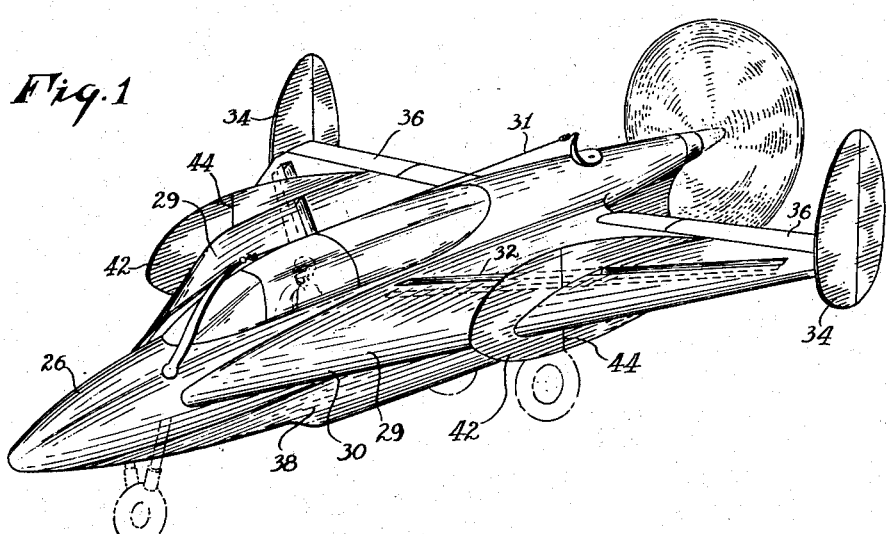
Figure 1 is a perspective view of an aircraft embodying this invention.

The preferred embodiment of this invention comprises an aircraft having a central body portion 26 and wings 29 extending from opposite sides of the body portion 26. The wings 29 are cambered airfoils shaped to give lift and preferably of low aspect ratio and of approximately triangular plan form with swept-back leading edges 30. An aerial 31 is provided for receiving impulses of radiant energy for communication, or in the case of pilotless aircraft for operating control apparatus with which the craft may be equipped.

One of the difficulties in the prior art with tailless aircraft having wings of generally triangular plan, as used with this invention, has been the lack of longitudinal stability of the aircraft.

The airfoil section is designed to obtain a maximum of stability. In order to keep the center of pressure from moving forward at high angles of attack, the wings are provided with slots 32 through which air can pass from the underside of the wings to the top surface of the rearward portion of the wings. This construction retains the lift on the rear sections in the event that the aircraft is displaced by air currents and approaches a stall.

Another feature of the wing design is the reverse curve of the chord. The rearward part of the wing is set negative to the forward part, as illustrated in Fig. 4. This construction causes the aircraft to nose up in the event that it goes into a dive, or nose down when approaching a stall. This reverse curve of the airfoil section helps to stabilize the center of pressure.

This invention also obtains longitudinal stability in part by the use of tip plates 34. One of these plates is located at the outer edge of each wing and extends for a substantial distance both above and below the wing surfaces. The chord at the tips preferably has a smaller angle of incidence than at the wing roots.

The tip plates prevent air from spilling from the tips, reduce tip vortices, and otherwise control the flow of air over the wings to maintain lift over the rearward portion of the wing, particularly when approaching a stalling angle.

The wings have flaps 36 which operate both as elevators for controlling the angle of attack and as ailerons for steering the aircraft. While the preferred embodiment of the invention has no rudder, it will be understood that the construction can be modified to provide one or more flaps movable about a vertical axis and designed to serve as a rudder. It is a feature of the invention that the wing tip plates 34 extend back at least as far as the trailing edges of the flaps 36, and preferably extend beyond the trailing edges of the flaps. The rearward ends of the tip plates can be used as rudders, if desired. The tip plates increase the air flow over the flaps and make the flaps more effective.

Lateral stability of the aircraft is further increased by a vertical keel 38 that forms the lower portion of the aircraft body 26. The fin 38 extends below the lifting surfaces of the wings and extends both forward and rearward of the center of gravity of the aircraft. The vertical fin below the wing disrupts or reduces the air-flow from one side of the craft to the other when the craft moves with a sideways component, as when skidding or slipping. In this way it serves to blanket one wing and reduce its lift, while increasing the lift of the other. This is possible because of the combination of sweepback and vertical surface extending downward from the wing. This provides lateral stability.

Upper vertical fins 42 serve to provide correct centers of area and directional stability. The wing tips, set negative to the wing root chord, in combination with the wing sweepback produce longitudinal stability. The large sweepback and large chord relative to the wing span, in combination with a smaller wing tip angle than wing root angle, provides larger corrective center of pressure travel, greater longitudinal distance between control surfaces and center of gravity, and therefore makes possible greater stability and control while in flight than in other flying wing types. One great fault that so far has made flying wings less safe than aircraft with remote tail surfaces is the short moment arm between the control surfaces and the center of gravity, and the short corrective movement fore and aft of the center of pressure.

The tip plates are not required for high speed but are a distinct advantage in increasing lift when flying at high wing angles of attack, such as required when landing. They reduce "tip spill" at high angles.

Figure 2:
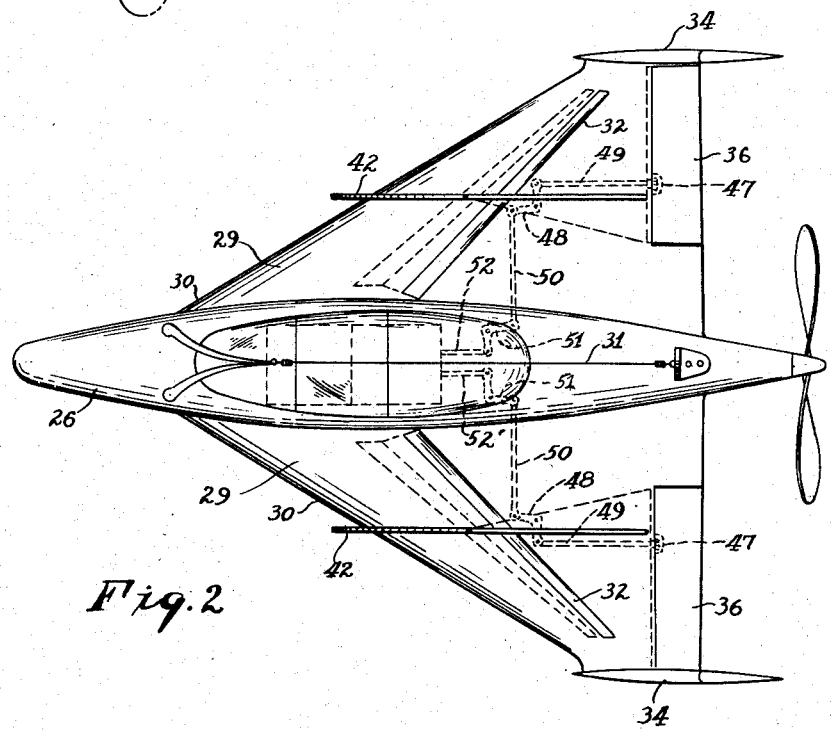
Figure 2 is a top plan view of the aircraft shown in Figure 1.

The leading edge, intermediate fins 42 may be flexed or turned sideways, as indicated in dotted lines in Fig. 2, along hinges 44 to guide the airflow beneath the wing, so that it flows more nearly parallel with the chord, thereby reducing the flow towards the wing tips, and increasing the wing efficiency. They are required only when high lift at slow speed is desired.

The motion transmitting links for operating the flaps 36 are shown in Figs. 2 and 3. There is a horn 47 extending downward from each flap 36, and the horn 47 is connected with one end of a bell crank 48 by a link 49. The other end of the bell crank 48 is connected to a link 50 that extends inwardly to the body of the aircraft.

The links 50 that extend into the body 26 from opposite sides connect to the rearward ends of bell cranks 51. The other ends of the bell cranks 51 are connected with parallel links 52 and 52' that extend forward to the steering and elevator control mechanism.

When the parallel links 52 and 52' are moved forward simultaneously, the flaps 36 are depressed. When the parallel links 52 and 52' are moved rearwardly at the same time, the flaps 36 are raised. If the link 52 is moved forward while the link 52' is moved rearward, one of the flaps 36 is depressed and the other flap 36 is raised.

The preferred embodiment of the invention has been described, but changes and modifications can be made without departing from the invention as defined in the claims.

I claim as my invention:

1. In aircraft which has wings comprising cambered lifting surfaces with swept-back leading edges and a chord that decreases from the roots to the tips of the wings, each wing having horizontal control surfaces forming at least a part of the trailing edge of the wing, and a fuselage between the wings, the improvement which comprises a keel attached to and extending downwardly from said fuselage below the wings for a substantial distance to blanket one wing and to reduce its lift while increasing the lift of the other wing when the aircraft moves with a sideways component as when skidding or slipping, and other vertically extending elements connected with the aircraft and adding to the total lateral area, at least a major portion of the total lateral area of said elements being rearward of the center of gravity of the aircraft, whereby the center of area of the lateral area of the aircraft is rearward of the center of gravity of said aircraft, said keel having a lateral area substantially greater than that of any other structure projecting below either wing at regions spaced spanwise from the fuselage.

2. In an aircraft that has wings with cambered lifting surfaces and a chord that decreases from the roots to the tips of the wings with the tip chord at a lesser angle of incidence than the root chord, each wing having horizontal control surfaces forming at least a part of the trailing edge of the wing and vertically extending plates attached to the tip of each wing and extending both above and below the wing and approximately parallel to the wing chord for stopping the spill of air over the wing tips, the improvement which comprises a keel connected with the aircraft and extending downwardly from a region at the spanwise center of the aircraft between the wings and for a substantial distance below the wings to blanket one wing and reduce its lift while increasing the lift of the other wing when the aircraft moves with a sidewise component, as when skidding or slipping, and other vertically extending elements connected with the wings and extending substantially parallel to the intended direction of flight of the aircraft and adding to the total lateral area, at least a major portion of the total lateral area of said elements being rearward of the center of gravity of the aircraft, whereby the center of area of the lateral area of the aircraft is rearward of the center of gravity of the aircraft, said keel having a lateral area substantially greater than that of any other structure projecting below either wing at regions spaced spanwise from the keel.

CHARLES H. GRANT.

References Cited in the file of this patent

UNITED STATES PATENTS

| Number | Name | Date |
|---|---|---|
| 1,157,636 | Ogrissek | Oct. 19, 1915 |
| 1,724,110 | Reid | Aug. 13, 1929 |
| 1,913,169 | Martin | June 6, 1933 |
| 2,173,538 | McKellar | Sept. 19, 1939 |
| 2,260,952 | Novack | Oct. 28, 1941 |
| 2,316,885 | Ortega | Apr. 20, 1943 |
| 2,397,526 | Bonbright | Apr. 2, 1946 |
| 2,412,646 | Northrop | Dec. 17, 1946 |
| 2,417,821 | Harcum | Mar. 25, 1947 |
| 2,439,048 | Korff | Apr. 6, 1948 |
| 2,496,087 | Fleming | Jan. 31, 1950 |
| 2,557,522 | Vautier | June 19, 1951 |

FOREIGN PATENTS

| Number | Country | Date |
|---|---|---|
| 12,820 | Great Britain | Oct. 5, 1916 |
| 133,559 | Great Britain | Oct. 16, 1919 |
| 460,636 | Great Britain | Feb. 1, 1937 |
| 717,575 | France | Oct. 20, 1931 |